(12) United States Patent
Murayama et al.

(10) Patent No.: US 9,502,753 B2
(45) Date of Patent: Nov. 22, 2016

(54) COMMUNICATION TERMINAL DEVICE (71) Applicant: Murata Manufacturing Co., Ltd., Nagaokakyo-shi, Kyoto-fu (JP)

(72) Inventors: Hiromi Murayama, Nagaokakyo (JP); Shinichi Nakano, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 16 days.

(21) Appl. No.: 14/709,683

(22) Filed: May 12, 2015

(65) Prior Publication Data

US 2015/0244064 A1    Aug. 27, 2015

Related U.S. Application Data (63) Continuation of application No. PCT/JP2014/082207, filed on Dec. 5, 2014.

(30) Foreign Application Priority Data

Dec. 26, 2013  (JP) .................................. 2013-269922

(51) Int. Cl.
| | | |
|---|---|---|
| *H01Q 1/24* | (2006.01) | |
| *H01Q 1/52* | (2006.01) | |
| *H01Q 1/22* | (2006.01) | |
| *G06K 7/10* | (2006.01) | |
| *H01Q 7/00* | (2006.01) | |
| *H01F 27/36* | (2006.01) | |
| *H01F 38/14* | (2006.01) | |

(52) U.S. Cl.
CPC .......... *H01Q 1/243* (2013.01); *G06K 7/10336* (2013.01); *H01F 27/367* (2013.01); *H01F 38/14* (2013.01); *H01Q 1/2216* (2013.01); *H01Q 1/52* (2013.01); *H01Q 7/00* (2013.01)

(58) Field of Classification Search
USPC ................................ 343/702, 841
See application file for complete search history.

(56) References Cited

U.S. PATENT DOCUMENTS

| | | | | |
|---|---|---|---|---|
| 7,825,870 B2* | 11/2010 | Zhu | .................. | H01Q 1/243 343/702 |
| 8,400,365 B2* | 3/2013 | Kato | ................ | G06K 19/07749 340/572.7 |
| 8,922,438 B2* | 12/2014 | Nakano | ................ | H01Q 1/2225 343/702 |
| 2012/0306714 A1 | 12/2012 | Yosui et al. | | |
| 2014/0340273 A1 | 11/2014 | Kato et al. | | |

FOREIGN PATENT DOCUMENTS

| | | |
|---|---|---|
| JP | 4687832 B2 | 5/2011 |
| JP | 2012-213126 A | 11/2012 |
| WO | 2011/129151 A1 | 10/2011 |

OTHER PUBLICATIONS

Official Communication issued in International Patent Application No. PCT/JP2014/082207, mailed on Feb. 10, 2015.

* cited by examiner

*Primary Examiner* — Howard Williams
(74) *Attorney, Agent, or Firm* — Keating & Bennett, LLP (57) ABSTRACT

A communication terminal device includes a power feeding coil connected to a power feeding circuit, a planar radiation conductor arranged in the vicinity of the power feeding coil and including a cutout portion overlapping with a coil opening of the power feeding coil when viewed in a plan view, and a rear metal body arranged at a side opposite to the planar radiation conductor with respect to the power feeding coil and in the vicinity of the planar radiation conductor, wherein a punched portion which does not overlap with at least a portion of the power feeding coil when viewed in a plan view and has a shape different from a shape of the cutout portion on the planar radiation conductor is provided on the rear metal body.

16 Claims, 12 Drawing Sheets

COMMUNICATION TERMINAL DEVICE

BACKGROUND OF THE INVENTION

1. Field of the Invention

The present invention relates to a communication terminal device that is preferably used for a radio-frequency identification device (RFID) system and a near field communication system.

2. Description of the Related Art

In an RFID system in a high frequency (HF) range and a near field communication (NFC) system, an antenna for communication is mounted on each communication terminal device such as a cellular phone terminal in order to perform communication between the communication terminal device and a reader/writer or perform communication between the communication terminal devices. Japanese Patent No. 4687832 discloses an antenna that is provided on a communication terminal device as described above.

As disclosed in Japanese Patent No. 4687832, an opening and a slit are provided on a planar conductor to which a power feeding coil comes close such that current induced by a magnetic field generated in the power feeding coil flows along end edges thereof (so that the magnetic field is not cancelled).

In a mobile communication terminal device such as a smart phone, various components are mounted with high density and a metal body (hereinafter, "rear metal body") having a large area, such as a metal chassis and a shield plate, tends to be arranged in the vicinity of the planar conductor and the power feeding coil. With this configuration, the rear metal body acts so as to cancel electric current flowing through the power feeding coil and the induced current flowing through the planar conductor in some cases. This results in the lowering of antenna radiation characteristics by the power feeding coil and the planar conductor in some cases.

When a magnetic body sheet is interposed between the rear metal body and the power feeding coil and a thickness dimension and an area of the magnetic body sheet are increased, the power feeding coil and the planar conductor are magnetically shielded from the rear metal body. Accordingly, the phenomenon that the current flowing through the power feeding coil and the current flowing through the planar conductor are cancelled by the current induced in the rear metal body can be suppressed. However, the magnetic body sheet is expensive, and an increase thereof in thickness and size leads increase in cost. Further, the increase thereof in the thickness and the size can be a factor inhibiting reduction in size and increase in density of the mobile communication terminal device.

SUMMARY OF THE INVENTION

Preferred embodiments of the present invention provide a communication terminal device that significantly reduces or prevents induced current generated in a rear metal body and ensures antenna characteristics without increasing a size of a magnetic body sheet that provides magnetic shielding.

A communication terminal device according to an aspect of various preferred embodiments of the present invention includes a power feeding coil that is connected to a power feeding circuit, a planar radiation conductor that is arranged in the vicinity of the power feeding coil and includes a cutout portion overlapping with a coil opening of the power feeding coil when viewed in a plan view, and a rear metal body that is arranged at a side opposite to the planar radiation conductor with respect to the power feeding coil and is arranged in the vicinity of the planar radiation conductor, wherein a punched portion which does not overlap with at least a portion of the power feeding coil when viewed in a plan view, and has a shape different from a shape of the cutout portion of the planar radiation conductor is provided on the rear metal body at a position corresponding to the power feeding coil.

According to various preferred embodiments of the present invention, induced current that is generated in a rear metal body is significantly reduced or prevented, and antenna characteristics are ensured without providing a thick and large magnetic body sheet to provide magnetic shielding. Therefore, the communication terminal device ensures a sufficient communication distance while being reduced in size and increased in density.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 1A and 1B are outer appearance views of a communication terminal device 101 according to a first preferred embodiment, wherein

DETAILED DESCRIPTION OF THE PREFERRED EMBODIMENTS

Hereinafter, preferred embodiments of the present invention are described using some specific examples with reference to the drawings. The same reference numerals denote the same features or elements in the individual drawings. The various preferred embodiments of the present invention are merely examples and partial replacement or combination of configurations as described in different preferred embodiments can be made.

First Preferred Embodiment

Figure 1A:
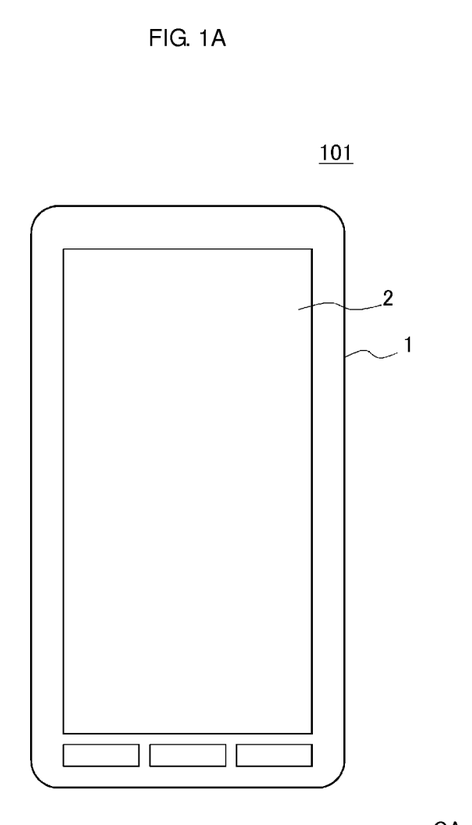
FIG. 1A is a front view and FIG. 1B is a rear view.
Figure 1B:
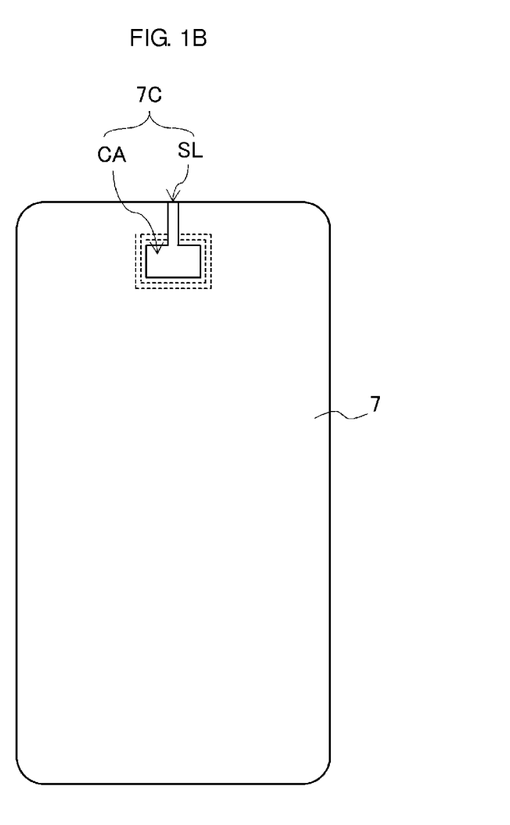

FIG. 1 includes outer appearance views illustrating a communication terminal device 101 according to a first preferred embodiment of the present invention, and FIG. 1A is a front view and FIG. 1B is a rear view. A front housing 1 is observed at the front side of the communication terminal device 101 and the front surface of a display/touch panel 2 is exposed. A planar radiation conductor 7 as a rear surface cover is provided on the rear surface of the communication terminal device 101 as an outer surface of the device. The planar radiation conductor 7 is an aluminum molded product, for example. A cutout portion 7C including a conductor opening CA and a slit portion SL is provided in the planar radiation conductor 7. The conductor opening CA defines and serves as a lens opening of a camera module, for example, in some cases, but it is not illustrated in FIG. 1B.

Figure 2:
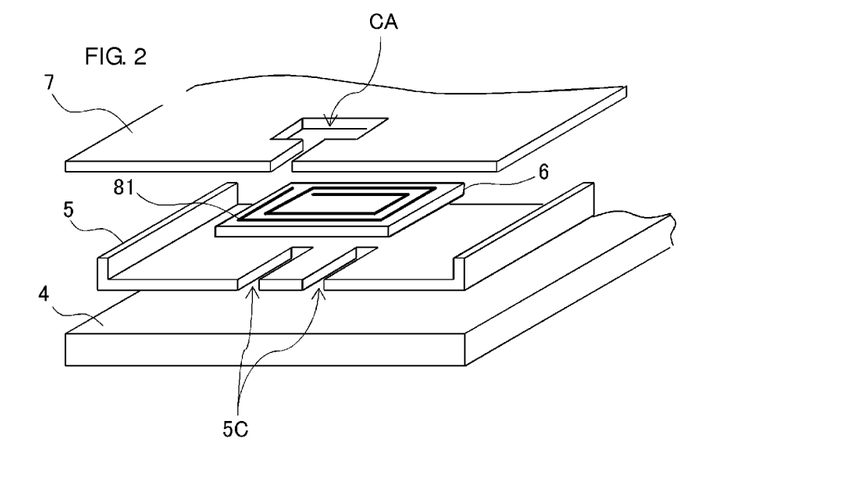
FIG. 2 is an exploded perspective view of a main portion of the communication terminal device 101.

FIG. 2 is an exploded perspective view of a main portion of the communication terminal device 101. A rear metal body 5 as a chassis and a printed wiring board 4 are accommodated between the front housing 1 and the planar radiation conductor (rear surface cover) 7 as illustrated in FIGS. 1A and 1B. Further, a power feeding coil 81 and a magnetic body sheet 6 are arranged between the planar radiation conductor 7 and the rear metal body 5.

Various circuits are provided on the printed wiring board 4. A power feeding circuit that is connected to the power feeding coil 81 is also provided on the printed wiring board 4.

The rear metal body 5 is a magnesium molded product, for example, and is used as a structural member to maintain the strength of the communication terminal device and a conductor plate as an electrostatic shield. In the present preferred embodiment, punched portions 5C are provided on the rear metal body 5.

The power feeding coil 81 is a conductor pattern provided on a flexible substrate, for example, and is handled in a state of a power feeding coil sheet configured by the power feeding coil 81 and the flexible substrate.

The magnetic body sheet 6 is a resin molded product or a ferrite plate filled with ferrite powder, for example. The magnetic body sheet 6 is bonded to the rear surface of the planar radiation conductor 7 together with the above-mentioned power feeding coil. The power feeding coil 81 and the power feeding circuit on the printed wiring board 4 are connected to each other with a pogo pin (contact probe), for example.

Figure 3:
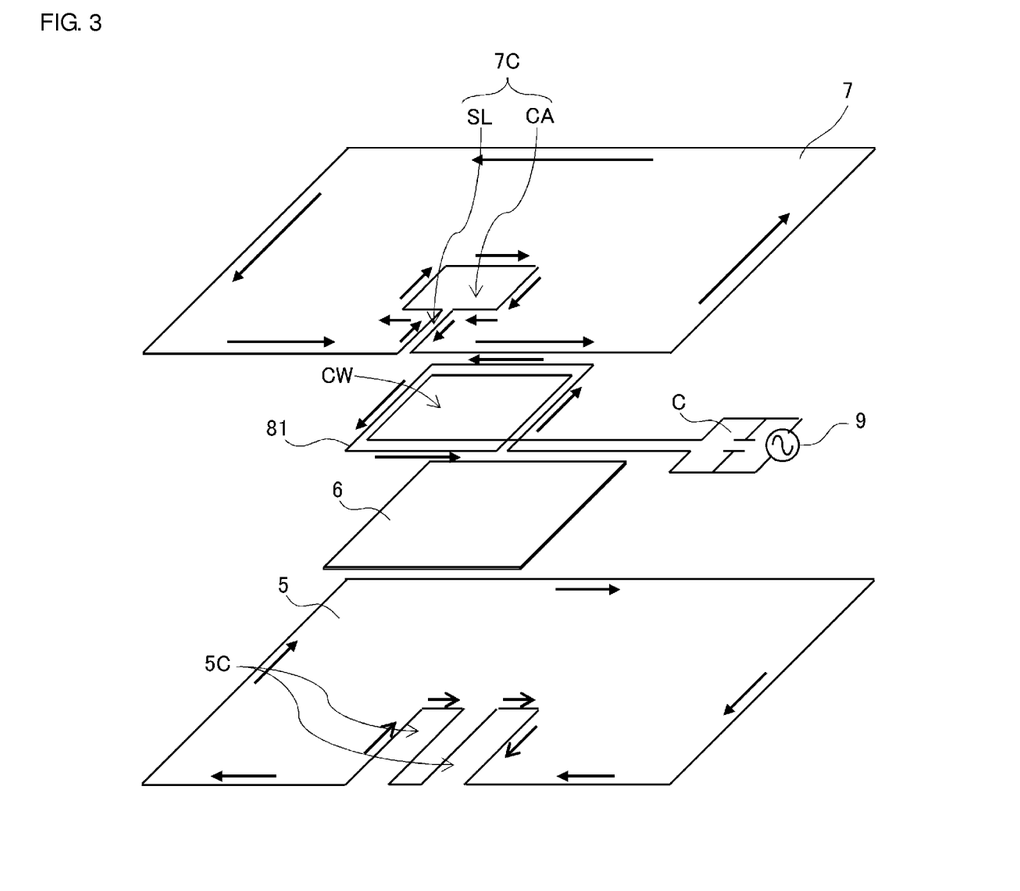
FIG. 3 is a view illustrating current flowing through a power feeding coil 81, a planar radiation conductor 7, and a rear metal body 5.

FIG. 3 is a view illustrating current flowing through the power feeding coil 81, the planar radiation conductor 7, and the rear metal body 5. In FIG. 3, the individual members are drawn so as to be separated from one another in a lamination direction for the convenience of explanation. A capacitor C configured to perform resonance frequency setting and impedance matching and a power feeding circuit 9 are connected to the power feeding coil 81.

As illustrated in FIG. 3, when current in the direction as indicated by arrows flows through the power feeding coil 81, current as indicated by arrows flows through the planar radiation conductor 7. That is to say, current is induced along the edge ends of the conductor opening CA and the slit portion SL of the planar radiation conductor 7 by the current flowing through the power feeding coil 81, and the current flows along the outer edges of the planar radiation conductor 7. A magnetic shielding action of the magnetic body sheet 6 is not complete, so that the current flowing through the power feeding coil 81 induces current as indicated by arrows in the vicinity of the punched portions 5C of the rear metal body 5. Further, the current flowing through the planar radiation conductor 7 induces current as indicated by arrows along the outer peripheral edges of the rear metal body 5.

Figure 4A:
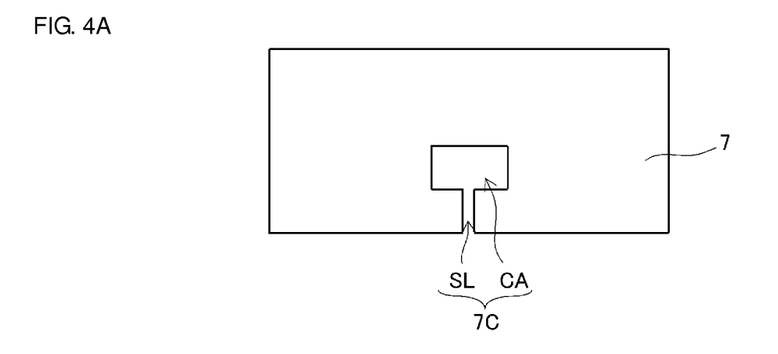
FIGS. 4A, 4B, 4C, and 4D are views illustrating a positional relationship among individual members of an antenna portion in the first preferred embodiment of the present invention when viewed in a plan view.
Figure 4B:
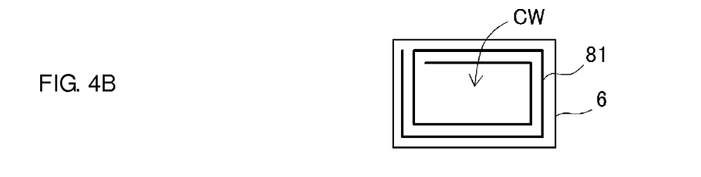
Figure 4C:
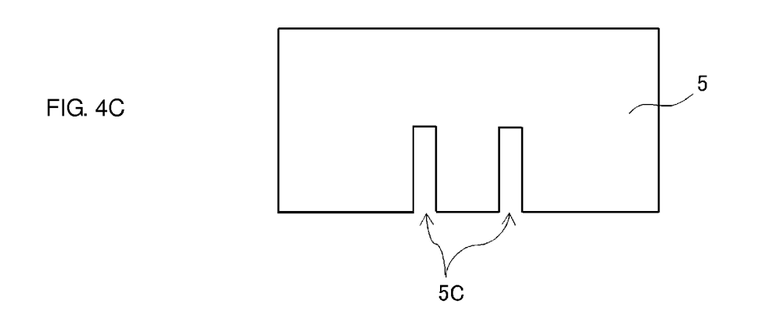
Figure 4D:
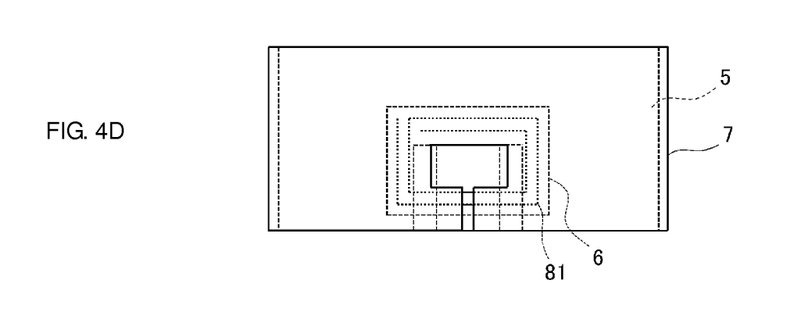

FIGS. 4A, 4B, 4C, and 4D are views illustrating a positional relationship among the above-mentioned individual members when viewed in a plan view. FIG. 4A is a plan view of the planar radiation conductor 7, FIG. 4B is a plan view of the power feeding coil 81 and the magnetic body sheet 6, and FIG. 4C is a plan view of the rear metal body 5. FIG. 4D is a plan view in a state where these members are laminated. As is seen from FIG. 4D, the punched portions 5C having shapes which do not overlap with at least a portion of the power feeding coil 81 and are different from the shape of the cutout portion 7C on the planar radiation conductor 7 are provided on the rear metal body 5 at positions corresponding to the power feeding coil 81.

Figure 16:
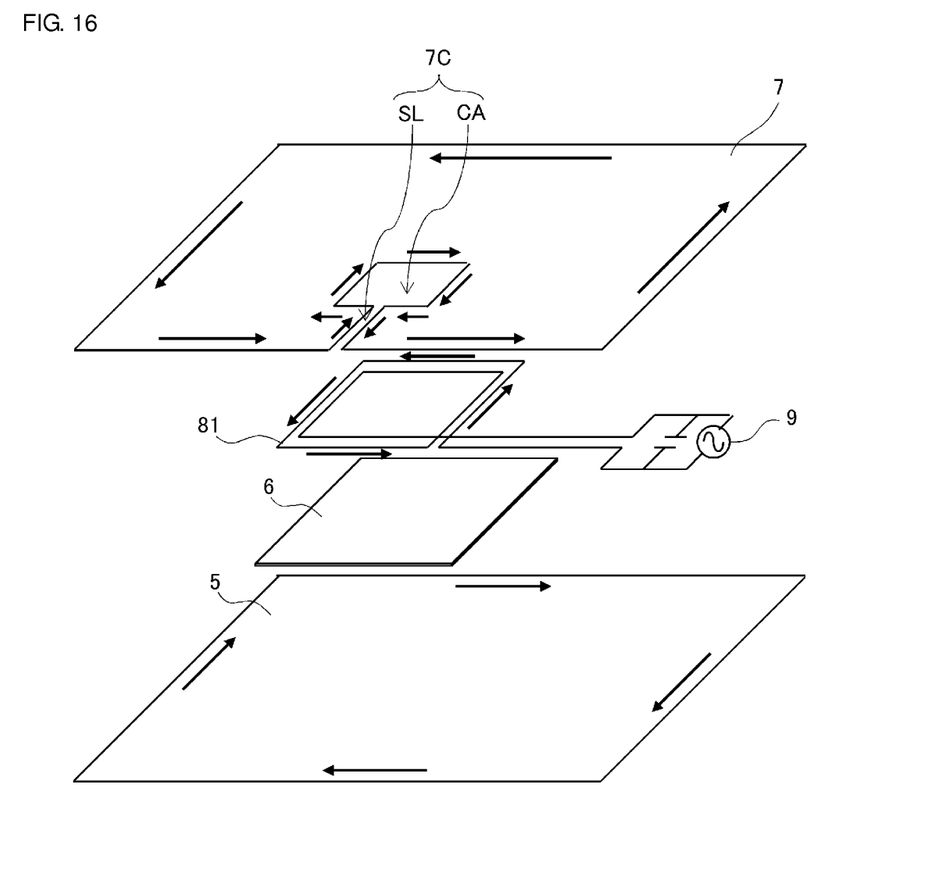
FIG. 16 is a view illustrating current flowing through the power feeding coil 81, the planar radiation conductor 7, and the rear metal body 5 in a communication terminal device as a comparative example.

FIG. 16 illustrates current flowing through the power feeding coil 81, the planar radiation conductor 7, and the rear metal body 5 in a communication terminal device as a comparison example. In the comparison example, no punched portion 5C is provided on the rear metal body 5.

As illustrated in FIG. 16, when current in the direction as indicated by arrows flows through the power feeding coil 81, current as indicated by arrows flows through the planar radiation conductor 7. That is to say, current flowing through the power feeding coil 81 induces current along the edge ends of the conductor opening CA and the slit portion SL on the planar radiation conductor 7, and the current flows along the outer edges of the planar radiation conductor 7. If the area and the thickness of the magnetic body sheet 6 are increased and the magnetic shielding action thereof is complete, current is not induced into the rear metal body 5. However, if the magnetic shielding action of the magnetic body sheet 6 is not complete, current is induced into the rear metal body 5 by a magnetic field that is generated from the cutout portion 7C of the planar radiation conductor 7, which has specially high current density. As indicated by arrows in FIG. 16, the current flowing through the planar radiation conductor 7 induces current into the rear metal body 5. With these actions, the current flowing through the power feeding coil 81 and the induced current flowing through the planar radiation conductor 7 are cancelled.

On the other hand, in the communication terminal device of the present preferred embodiment, as illustrated in FIG. 3, the punched portions 5C are provided on the rear metal body 5 at the positions which do not overlap with at least a portion of the power feeding coil when viewed in a plan view at the positions corresponding to the power feeding coil 81. That is to say, the punched portions 5C oppose to at least a portion of the portion having high current density, so that induction of current into the rear metal body 5 is significantly reduced or prevented in comparison with the case where no punched portion 5C is provided on the rear metal body 5.

As is seen from FIG. 3 and FIG. 4, it is preferable that the punched portions 5C have shapes different from the shape of the cutout portion 7C on the planar radiation conductor 7. With this configuration, induction of current into the rear metal body 5 is significantly reduced or prevented in comparison with the configuration where the punched portion 5C having the same shape as the cutout portion 7C of the planar radiation conductor 7 is provided on the rear metal body 5. That is to say, if the punched portion 5C having the same shape as the cutout portion 7C of the planar radiation conductor 7 is provided on the rear metal body 5, current similar to the current flowing through the planar radiation conductor 7 is induced into the rear metal body 5 and magnetic field radiation from the planar radiation conductor 7 is offset. On the other hand, when the shape of the punched portion 5C of the rear metal body 5 is different from the shape of the cutout portion 7C of the planar radiation conductor 7, the above-mentioned "offset" does not easily occur and the planar radiation conductor 7 is operated as a radiation element.

As is seen from FIGS. 4B, 4C, and 4D, it is preferable that the punched portions 5C of the rear metal body 5 overlap with at least a portion of the inner edges of the coil opening CW of the power feeding coil 81 when viewed in a plan view. The inner edges of the coil opening CW of the power feeding coil 81 have high current density, so that induction of unnecessary current into the rear metal body 5 is significantly reduced or prevented effectively.

Further, the punched portions 5C of the rear metal body 5 do not overlap with the center of the coil opening CW of the power feeding coil 81 at the positions corresponding to the power feeding coil 81 preferably. Even when the center portion of the coil opening CW opposes to the rear metal body 5, current is not induced into the rear metal body 5. Therefore, with this configuration, a punched area of the rear metal body 5 is not increased unnecessarily and the mechanical strength of the rear metal body 5 is easy to be maintained.

Next, difference in antenna characteristics depending on the shape of the punched portion 5C of the rear metal body 5 will be described with reference to FIGS. 5A to 7C.

Figure 5A:
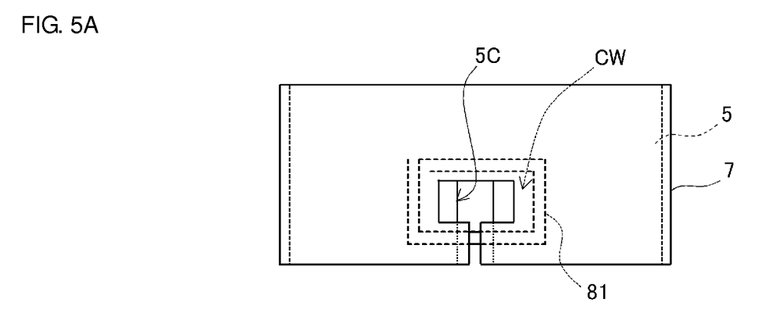
FIGS. 5A, 5B, and 5C are examples where a single punched portion 5C having the same area and each having a different shape is provided on the rear metal body 5.
Figure 5B:
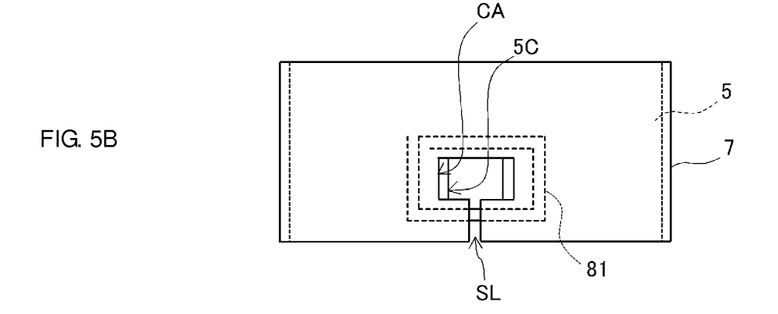
Figure 5C:
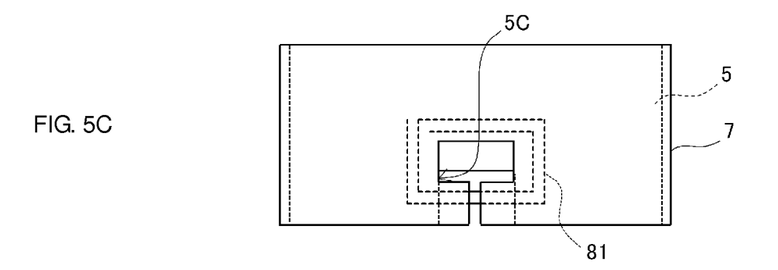

All of FIGS. 5A, 5B, and 5C are examples where the single punched portion 5C having the same area and a different shape is formed on the rear metal body 5. FIG. 5A is an example where the punched portion 5C having a rectangular or substantially rectangular shape which does not overlap with the inner edges of the coil opening CW of the power feeding coil 81 and extend in the direction perpendicular or substantially perpendicular to the outer edge of the rear metal body 5 is provided. FIG. 5B is an example where the punched portion 5C having a shape the same or approximately the same as the cutout portion including the conductor opening CA and the slit portion SL on the planar radiation conductor 7 is provided. FIG. 5C is an example where the punched portion 5C having a rectangular or substantially rectangular shape extending along the outer edge of the rear metal body 5 is provided.

Figure 6:
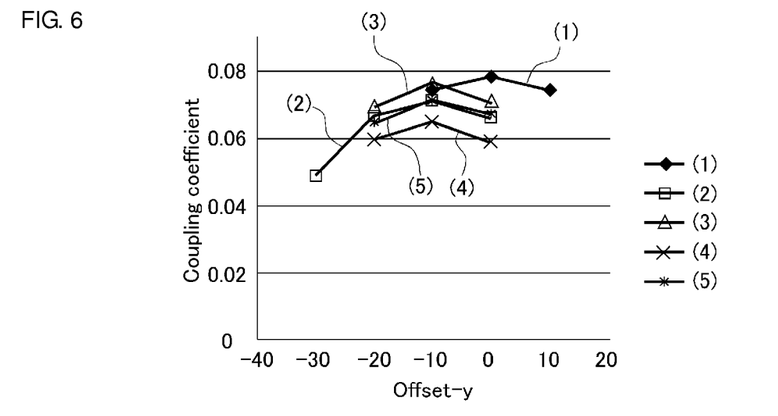
FIG. 6 is a graph illustrating simulation results of antenna characteristics of four communication terminal devices as illustrated in FIG. 4D and FIGS. 5A, 5B, and 5C.

FIG. 6 illustrates simulation results of the antenna characteristics of the four communication terminal devices as illustrated in FIG. 4D and FIGS. 5A, 5B, and 5C. A vertical axis in FIG. 6 indicates a coupling coefficient to an antenna of a reader/writer as a communication party and a horizontal axis indicates deviation (offset amount) from the antenna of the reader/writer in the y-axis (see, FIG. 7A) direction.

Figure 7A:
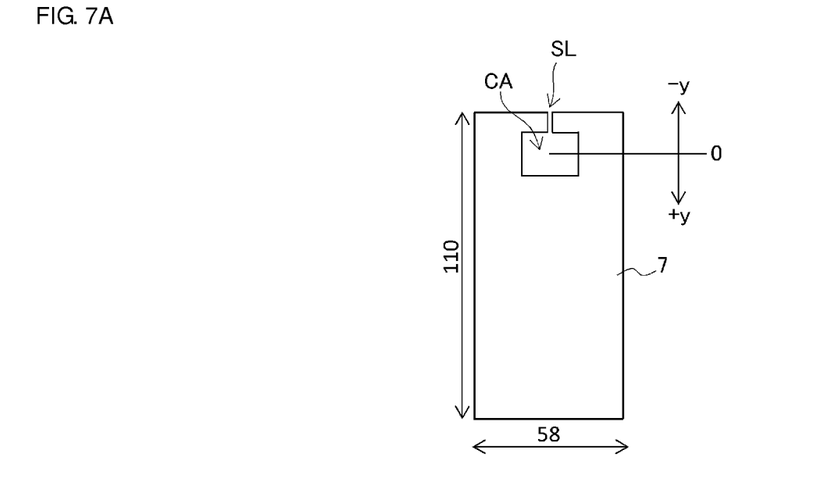
FIGS. 7A, 7B, and 7C are views illustrating dimension parameters for the simulation in the first preferred embodiment of the present invention.
Figure 7B:
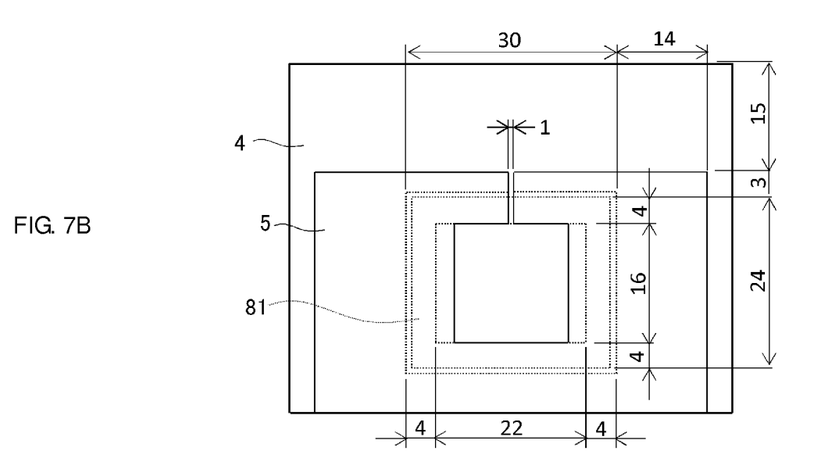
Figure 7C:
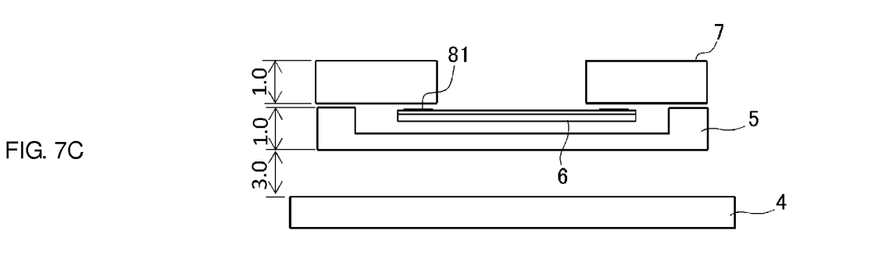

FIGS. 7A, 7B, and 7C are views illustrating dimension parameters for the simulation. Further, dimensions of the punched portions 5C as illustrated in FIG. 4C are 6×23 mm+6×23 mm, dimensions of the punched portion 5C as illustrated in FIG. 5A are 12×23 mm, dimensions of the punched portion 5C as illustrated in FIG. 5B are 16.8×16 mm+ slit portion, and dimensions of the punched portion 5C as illustrated in FIG. 5C are 22×12.55 mm, for example.

In FIG. 6, relationships between respective characteristic lines and the shapes of the punched portions 5C are as follows.

(1): Power feeding coil unit
   (2): Configuration of FIG. 5A
   (3): Configuration of FIG. 4D
   (4): Configuration of FIG. 5C
   (5): Configuration of FIG. 5B

Preferably, the punched portion 5C of the rear metal body 5 overlaps with the slit portion SL on the planar radiation conductor 7, which has high current density. Note that not only the slit portion SL has high current density and the characteristics are different depending on the shape of the punched portion.

As is seen by comparison between the characteristics (3) with the configuration as illustrated in FIG. 4D and the characteristics (2) with the configuration as illustrated in FIG. 5A, induction of unnecessary current into the rear metal body 5 is significantly reduced or prevented more effectively and a higher coupling coefficient is obtained in the case where the punched portions 5C are provided at positions opposite to portions having higher current density (the rear metal body does not oppose to portions having high current density). Further, as is seen by comparison among the characteristics (4) with the configuration as illustrated in FIG. 5C, the characteristics (2) with the configuration as illustrated in FIG. 5A, and the characteristics (5) with the configuration as illustrated in FIG. 5B, a higher coupling coefficient is obtained in the case where a larger portion of the punched portion 5C of the rear metal body 5 overlaps with the coil opening (the coil opening CW overlaps with the rear metal body 5 as less as possible).

The number of windings of the above-mentioned power feeding coil 81 preferably is seven and inductances of the power feeding coil when the punched portions 5C having each shape are provided (inductances of the power feeding coil in consideration of increase and decrease and the like of inductance by the rear metal body 5 and the planar radiation conductor 7) preferably are as follows, for example.

Configuration of FIG. 5A (characteristics (2)): 0.80 µH
   Configuration of FIG. 4D (characteristics (3)): 0.86 µH
   Configuration of FIG. 5C (characteristics (4)): 0.81 µH
   Configuration of FIG. 5B (characteristics (5)): 0.76 µH    As described above, the inductance of the power feeding coil 81 is less changed depending on the shapes of the punched portions 5C of the rear metal body 5. Accordingly, even when the punched portion 5C is provided on the rear metal body 5, matching between the power feeding coil 81 and the power feeding circuit 9 is achieved easily.

In the present preferred embodiment, the metal housing is configured to also function as the planar radiation conductor, so that a dedicated member as a radiation plate is not required to be provided, thus reducing the device in size. Further, the planar radiation conductor is not limited to the metal housing of the terminal and a thin metal sheet such as aluminum foil or a metal member such as a ground conductor may be used therefor.

Second Preferred Embodiment

Figure 8:
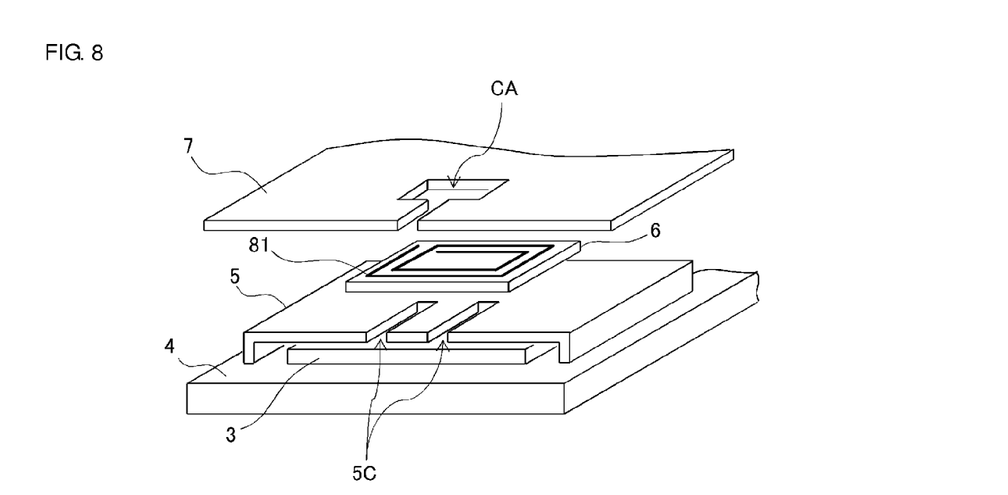
FIG. 8 is an exploded perspective view of a main portion of a communication terminal device 102 according to a second preferred embodiment of the present invention.

FIG. 8 is an exploded perspective view of a main portion of a communication terminal device according to a second preferred embodiment of the present invention. The rear metal body 5 as a shield plate and the printed wiring board 4 are accommodated between the front housing and the planar radiation conductor (rear surface cover) 7. Further, the power feeding coil 81 and the magnetic body sheet 6 are arranged between the planar radiation conductor 7 and the rear metal body 5.

Various circuits are provided on the printed wiring board 4. A power feeding circuit that is connected to the power feeding coil 81 is also provided on the printed wiring board 4. The rear metal body 5 is a molded product including a metal plate, for example. The punched portions 5C are provided on the rear metal body 5.

An integrated circuit IC 3 is mounted on the printed wiring board 4. The rear metal body 5 covers a range of the printed wiring board 4, which includes the IC 3 and the like. Other configurations preferably are those as described in the first preferred embodiment.

In the present preferred embodiment, the rear metal body 5 shields noise that is emitted from the printed wiring board 4 (in particular, the IC 3 and the like and a wiring conductor conducting thereto). The IC 3 may be an IC in the above-mentioned power feeding circuit, for example, or another IC (for example, an IC in an ultrahigh frequency (UHF) range).

Actions of the planar radiation conductor 7, the power feeding coil 81, the magnetic body sheet 6, and the printed wiring board 4 and other actions of the rear metal body 5 preferably are those as described in the first preferred embodiment.

Third Preferred Embodiment

Figure 9:
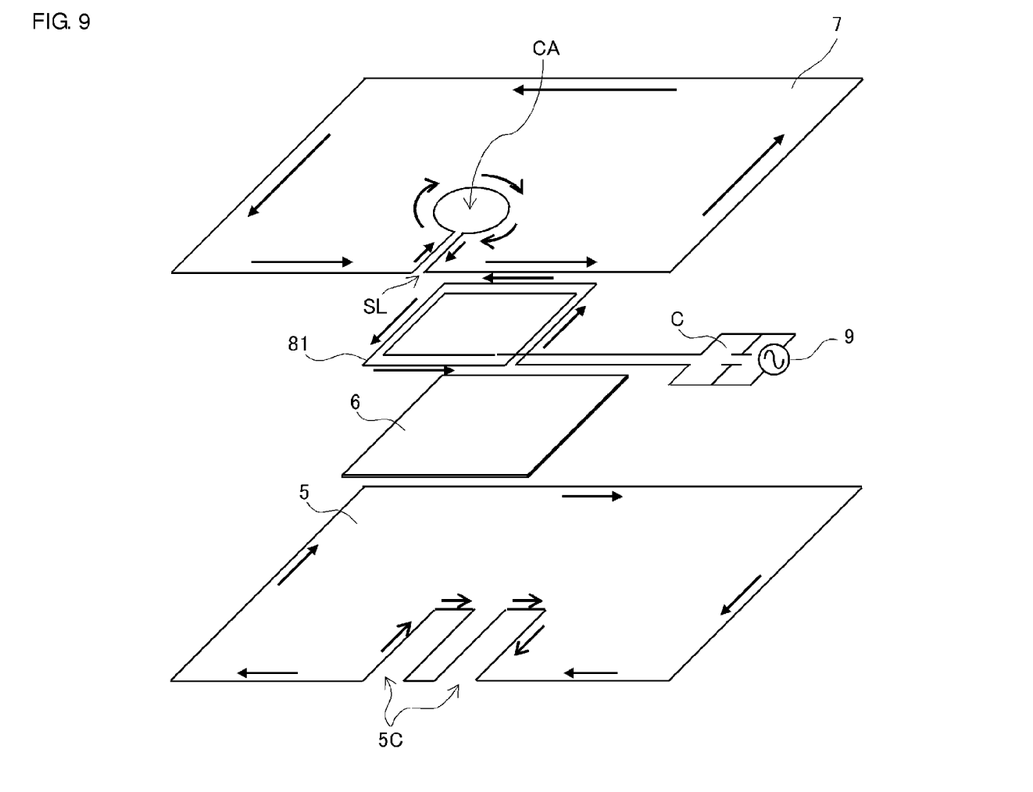
FIG. 9 is a schematic exploded perspective view of a main portion of a communication terminal device according to a third preferred embodiment of the present invention, and is a view illustrating current flowing through the power feeding coil 81, the planar radiation conductor 7, and the rear metal body 5.

FIG. 9 is a schematic exploded perspective view of a main part of a communication terminal device according to a third preferred embodiment of the present invention, and is a view illustrating current flowing through the power feeding coil 81, the planar radiation conductor 7, and the rear metal body 5. The communication terminal device is different from the communication terminal device as described in the first preferred embodiment in a shape of a cutout portion of the planar radiation conductor 7.

In the present preferred embodiment, a cutout portion including the conductor opening CA having a circular or substantially circular shape and the slit portion SL is provided on the planar radiation conductor 7. Other configurations preferably are the same as those in the first preferred embodiment.

Figure 10A:
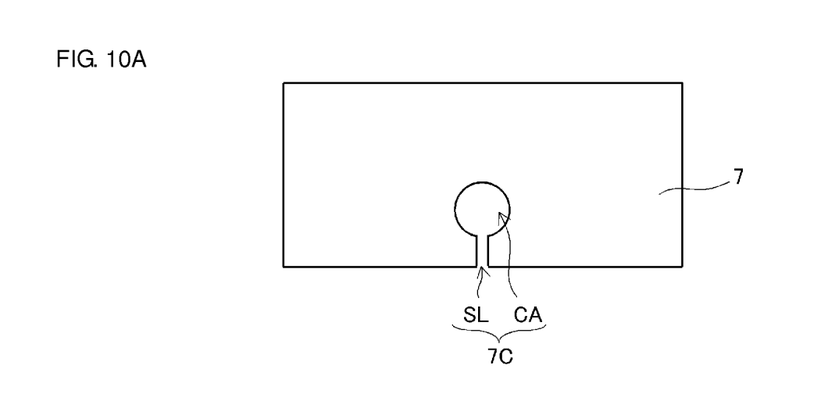
FIGS. 10A, 10B, 10C, and 10D are views illustrating a positional relationship among individual members of an antenna portion in the third preferred embodiment of the present invention when viewed in a plan view.
Figure 10B:
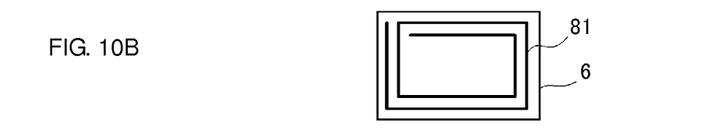
Figure 10C:
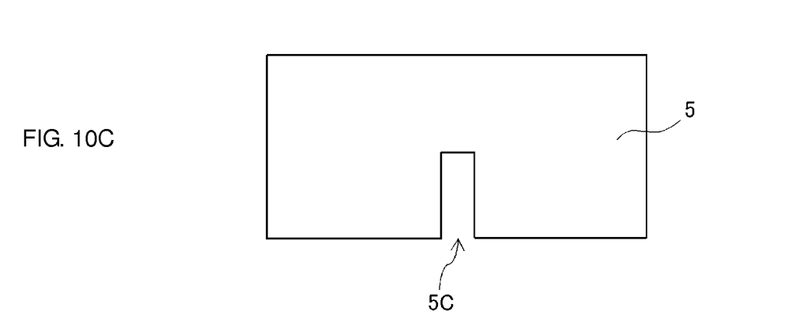
Figure 10D:
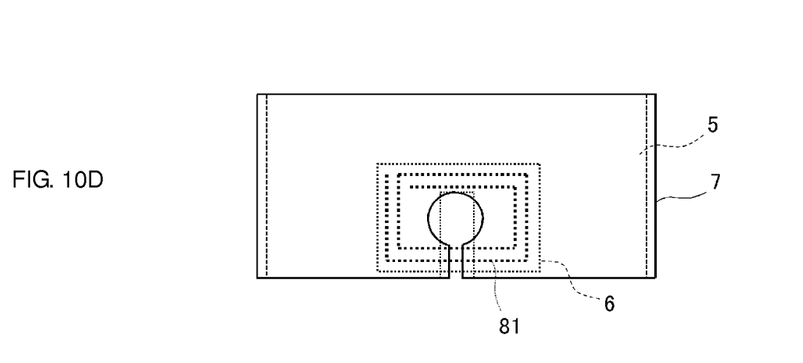

FIGS. 10A, 10B, 10C, and 10D are views illustrating a positional relationship among the above-mentioned individual members when viewed in a plan view. FIG. 10A is a plan view of the planar radiation conductor 7, FIG. 10B is a plan view of the power feeding coil 81 and the magnetic body sheet 6, and FIG. 10C is a plan view of the rear metal body 5. FIG. 10D is a plan view in a state where these members are laminated. As is seen from FIGS. 10A to 10D, the punched portion 5C having a shape which does not overlap with at least a portion of the power feeding coil 81 and is different from the shape of the cutout portion 7C on the planar radiation conductor 7 is provided on the rear metal body 5 at a position corresponding to the power feeding coil 81.

Also in the present preferred embodiment, induction of current into the rear metal body 5 is significantly reduced or prevented and the planar radiation conductor 7 is operated as a radiation element as in the case of the first preferred embodiment.

Next, differences in antenna characteristics depending on the shape of the punched portion 5C of the rear metal body 5 will be described with reference to FIGS. 11A to 12.

Figure 11A:
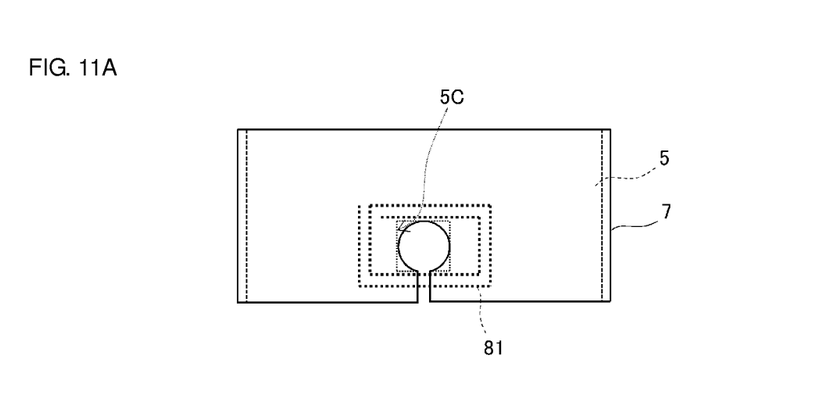
FIGS. 11A, 11B, and 11C are examples where each of the punched portions 5C having the same area is provided on the rear metal body 5.
Figure 11B:
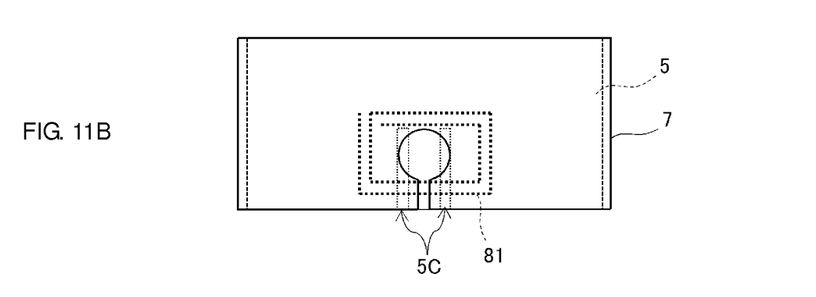
Figure 11C:
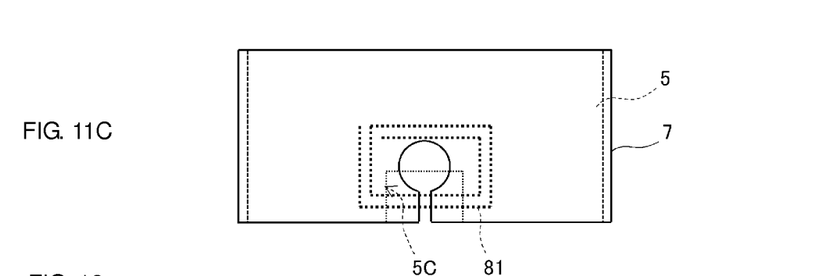

All of FIGS. 11A, 11B, and 11C are examples where each of the punched portions 5C having the same area is provided on the rear metal body 5. FIG. 11A is an example where the punched portion 5C having a shape the same or approximately the same as that of the cutout portion including the conductor opening CA and the slit portion SL on the planar radiation conductor 7 is provided. FIG. 11B is an example where the two slit-shaped punched portions 5C passing through the inner edges of the opening (CA) provided on the planar radiation conductor 7 are formed. FIG. 11C is an example where the punched portion 5C having a rectangular or substantially rectangular shape extending along the outer edge of the rear metal body 5 is provided.

Figure 12:
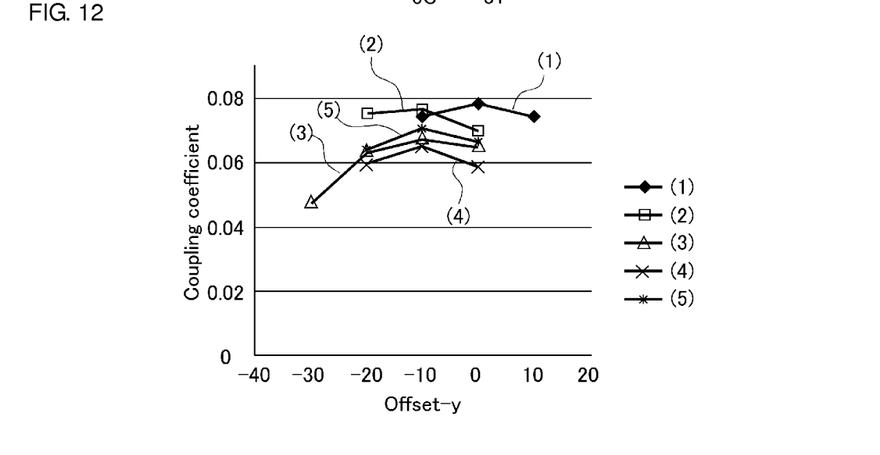
FIG. 12 is a graph illustrating simulation results of antenna characteristics of four communication terminal devices as illustrated in FIG. 10D and FIGS. 11A, 11B, and 11C.

FIG. 12 illustrates simulation results of antenna characteristics of the four communication terminal devices as illustrated in FIG. 10D and FIGS. 11A, 11B, and 11C. As in the case of the first preferred embodiment, a vertical axis indicates a coupling coefficient to an antenna of a reader/writer as a communication party and a horizontal axis indicates deviation (offset amount) from the antenna of the reader/writer in the y-axis. The dimension parameters for the simulation are the same as those as illustrated in FIG. 7. Note that the diameter of the circular conductor opening CA provided on the planar radiation conductor 7 preferably is about 16 mm and the length of the slit portion SL preferably is about 7 mm, for example.

In FIG. 12, relationships between respective characteristic lines and the shapes of the punched portion 5C are as follows.

(1): Power feeding coil unit
(2): Configuration of FIG. 10D
(3): Configuration of FIG. 11B
(4): Configuration of FIG. 11C
(5): Configuration of FIG. 11A

As is seen by comparison between the characteristics (3) with the configuration as illustrated in FIG. 11B and the characteristics (4) with the configuration as illustrated in FIG. 11C, a higher coupling coefficient is obtained in the case where the punched portions 5C are provided in portions opposite to portions having high current density (the rear metal body does not oppose to the portions having high current density). As is seen by comparison between the characteristics (5) with the configuration as illustrated in FIG. 11A and the characteristics (3) with the configuration as illustrated in FIG. 11B, a higher coupling coefficient is obtained in the case where a larger portion of the punched portion 5C of the rear metal body 5 overlaps with the conductor opening CA (the conductor opening CA overlaps with the rear metal body 5 as less as possible). As is seen by comparison between the characteristics (2) with the configuration as illustrated in FIG. 10D and the characteristics (5) with the configuration as illustrated in FIG. 11A, a higher coupling coefficient is obtained in the case where the punched portion 5C of the rear metal body 5 overlaps with the slit portion SL on the planar radiation conductor 7 (the slit portion SL overlaps with the rear metal body 5 as little as possible).

The number of windings of the above-mentioned power feeding coil 81 preferably is seven and inductances of the power feeding coil when the punched portions 5C having each shape are provided (inductances of the power feeding coil in consideration of increase and decrease and the like of inductance by the rear metal body 5 and the planar radiation conductor 7) are as follows.

Configuration of FIG. 10D (characteristics (2)): 0.83 μH
Configuration of FIG. 11B (characteristics (3)): 0.69 μH
Configuration of FIG. 11C (characteristics (4)): 0.71 μH
Configuration of FIG. 11A (characteristics (5)): 0.69 μH Thus, the inductance of the power feeding coil 81 is less changed depending on the shape of the punched portion 5C of the rear metal body 5. Accordingly, even when the punched portion 5C is provided on the rear metal body 5, matching between the power feeding coil 81 and the power feeding circuit 9 is achieved easily.

Fourth Preferred Embodiment

Figure 13A:
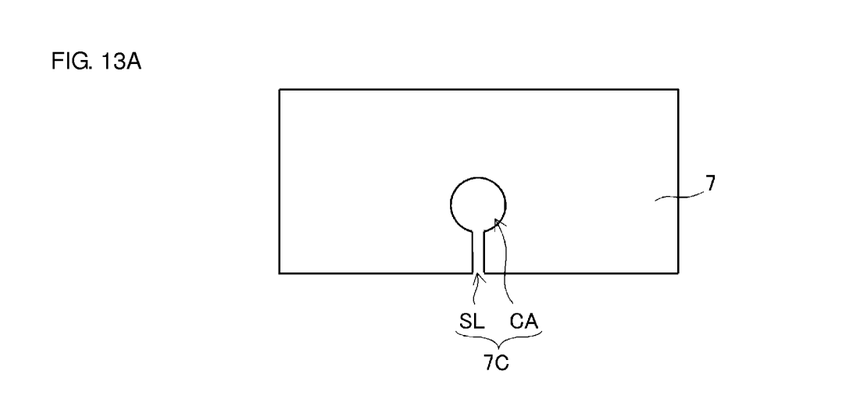
FIGS. 13A, 13B, 13C, and 13D are views illustrating the configuration of a main portion of an antenna portion of a communication terminal device according to a fourth preferred embodiment of the present invention.
Figure 13B:
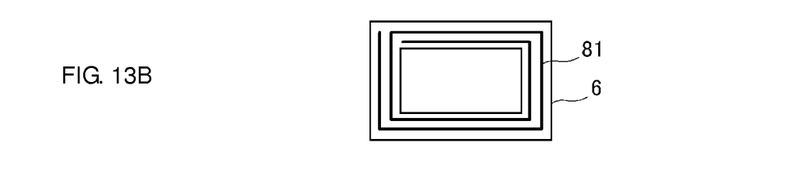
Figure 13C:
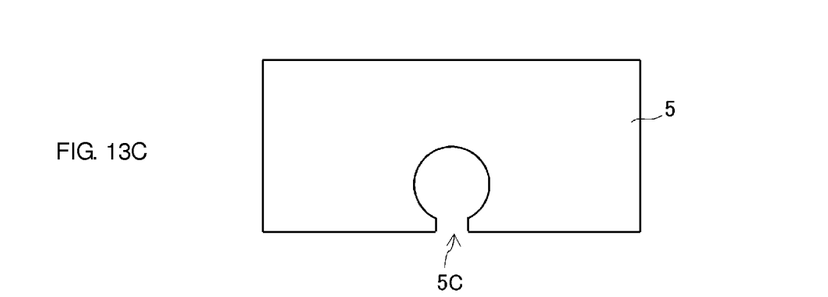
Figure 13D:
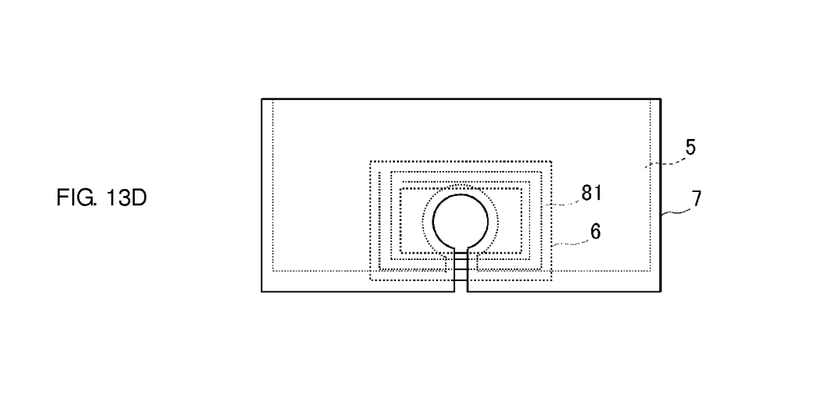

FIGS. 13A, 13B, 13C, and 13D are views illustrating the configuration of a main portion of an antenna portion of a communication terminal device according to a fourth preferred embodiment of the present invention. FIG. 13A is a plan view of the planar radiation conductor 7, FIG. 13B is a plan view of the power feeding coil 81 and the magnetic body sheet 6, and FIG. 13C is a plan view of the rear metal body 5. FIG. 13D is a plan view in a state where these members are laminated. As is seen from FIG. 13D, the punched portion 5C having a shape which does not overlap with at least a portion of the power feeding coil 81 when viewed in a plan view, and is different from the shape of the cutout portion 7C on the planar radiation conductor 7 is provided on the rear metal body 5 at a position corresponding to the power feeding coil 81. The shape of the cutout portion 7C on the planar radiation conductor 7 and the shape of the punched portion 5C on the rear metal body are similar to each other but the sizes thereof are different. The relationship is encompassed in a concept of the "different shape" according to various preferred embodiments of the present invention.

In the present preferred embodiment, the punched portion 5C of the rear metal body 5 does not overlap with inner edge portions of the opening 7C on the planar radiation conductor 7 when viewed in a plan view. Further, the punched portion 5C of the rear metal body 5 does not also overlap with inner edge portions of the slit portion SL on the planar radiation conductor 7. In addition, the outer edges of the rear metal body 5 do not also overlap with outer edge portions of the planar radiation conductor 7.

The inner edge portions of the opening 7C on the planar radiation conductor 7 are regions having the highest current density of induced current. Therefore, a portion of the rear metal body 5, which overlaps with the above-mentioned region having a high current density, is punched out, thus reducing eddy-current loss. Eddy-current loss that is generated on the inner edge portions of the slit portion SL and the outer edges of the rear metal body 5 is significantly reduced or prevented in the same manner. In particular, the current density on the outer edge portion (side) of the planar radiation conductor 7 at the side where the slit portion SL is provided is high. Therefore, one side of the rear metal body 5 does not overlap with the outer edge portion (side) of the planar radiation conductor 7 at the side where the slit portion SL is provided so as to further significantly reduce or prevent eddy-current loss.

Thus, according to the present preferred embodiment, the rear metal body 5 does not oppose to the region of the planar radiation conductor 7, which has high current density.

Therefore, current induction into the rear metal body 5 is significantly reduced or prevented and a function of the planar radiation conductor 7 as the radiation element is ensured.

Fifth Preferred Embodiment

Figure 14:
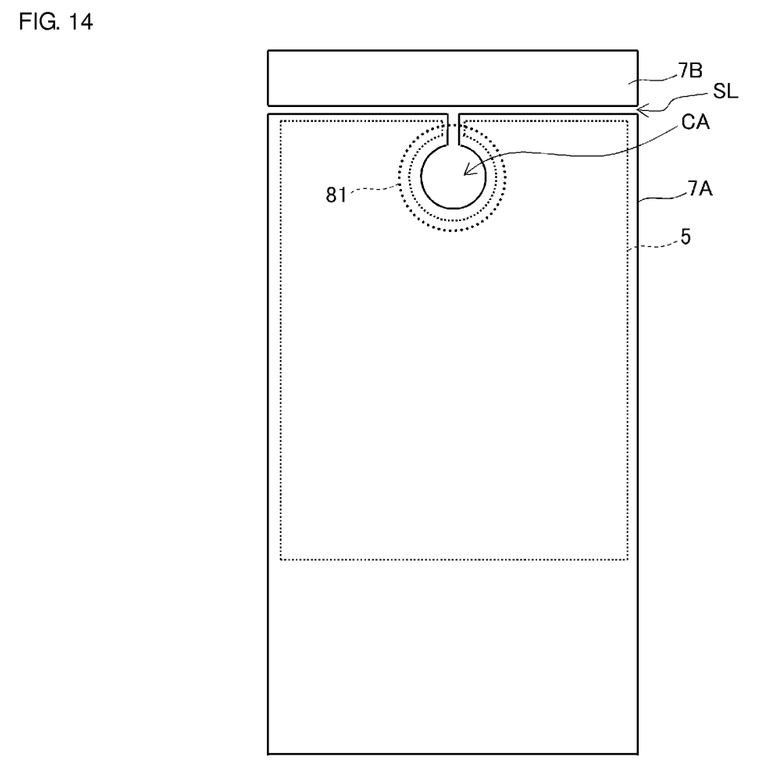
FIG. 14 is a plan view of a main portion of an antenna portion of a communication terminal device according to a fifth preferred embodiment of the present invention.

FIG. 14 is a plan view of a main portion of an antenna portion of a communication terminal device according to a fifth preferred embodiment of the present invention. In this example, the communication terminal device includes two planar radiation conductors 7A and 7B and includes the slit portion SL extending from the conductor opening CA to the outer edges in a T-shaped configuration.

Figure 15:
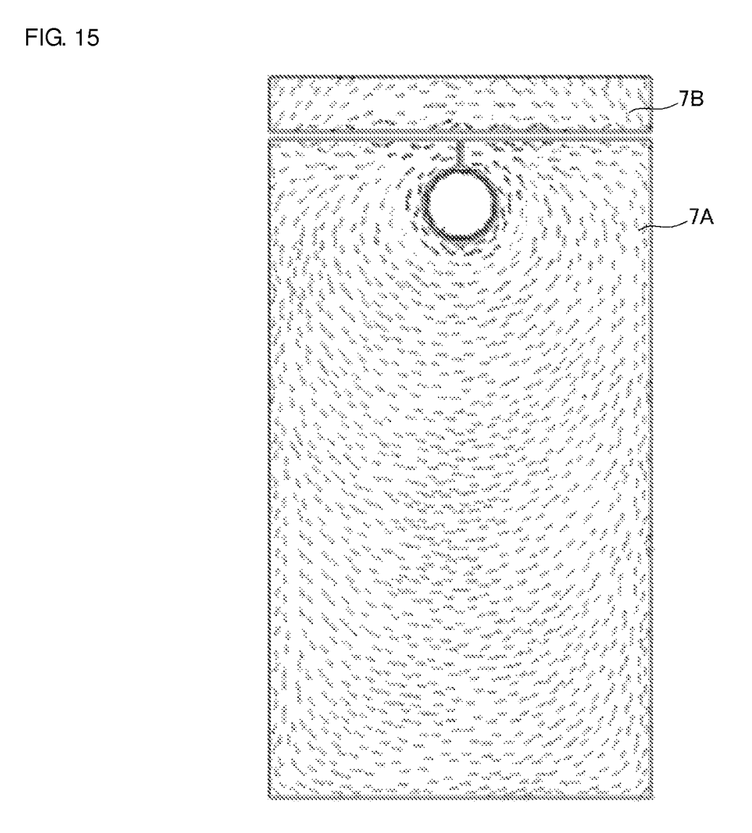
FIG. 15 is a view illustrating current density distribution of planar radiation conductors (7A and 7B).

FIG. 15 is a view illustrating current density distribution on the planar radiation conductors (7A and 7B).

Also when the slit portion SL having a diverging shape is provided, the inner edge of the conductor opening CA and edge portions of the slit portion SL have high current density. The rear metal body 5 is arranged so as not to oppose to regions of the planar radiation conductors (7A and 7B), which have high current density. Therefore, current induction to the rear metal body 5 is significantly reduced or prevented and a function of the planar radiation conductor 7 as the radiation element is ensured.

In each of the above-mentioned preferred embodiments, the metal chassis preferably is the rear metal body, for example. However, instead of the metal chassis, a shield plate in the housing or a ground electrode of the circuit substrate can be used as the rear metal body and various preferred embodiments of the present invention can be applied to this case in the same manner. That is to say, the lowering of the antenna characteristics on the radiation conductor is able to be reduced as low as possible without large loss of original functions of the rear metal body (for example, retaining of strength in the case of the metal chassis and shielding property in the case of the shielding metal plate).

In each of the above-mentioned preferred embodiments, the punched portions 5C on the rear metal body 5 preferably has a shape opened to the outer edge of the rear metal body 5, for example. However, the punched portion 5C may have a closed shape without being opened to the outer edge.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal device comprising:
  a power feeding coil that is connected to a power feeding circuit;
  a planar radiation conductor that is located in a vicinity of the power feeding coil and includes a cutout portion overlapping with a coil opening of the power feeding coil when viewed in a plan view; and a rear metal body that is located at a side opposite to the planar radiation conductor with respect to the power feeding coil and is located in a vicinity of the planar radiation conductor; wherein a punched portion which does not overlap with at least a portion of the power feeding coil when viewed in a plan view, and has a shape different from a shape of the cutout portion of the planar radiation conductor is provided on the rear metal body at a position corresponding to the power feeding coil.

2. The communication terminal device according to claim 1, wherein the punched portion of the rear metal body overlaps with at least a portion of an inner edge of the coil opening of the power feeding coil when viewed in a plan view.

3. The communication terminal device according to claim 1, wherein the punched portion of the rear metal body does not overlap with a center of the coil opening of the power feeding coil.

4. The communication terminal device according to claim 1, wherein
the cutout portion of the planar radiation conductor includes an opening and a slit portion that connects the opening and an outer edge end of the planar radiation conductor; and
the punched portion of the rear metal body overlaps with the slit portion of the planar radiation conductor when viewed in a plan view.

5. The communication terminal device according to claim 4, wherein an outer edge end of the rear metal body does not overlap with the outer edge end of the planar radiation conductor with which the slit portion is connected.

6. The communication terminal device according to claim 1, wherein the planar radiation conductor is a metal housing and the rear metal body is a shield plate, a metal chassis, or a ground electrode of a circuit substrate.

7. The communication terminal device according to claim 1, wherein a magnetic body sheet is arranged between the power feeding coil and the rear metal body.

8. The communication terminal device according to claim 1, wherein the power feeding coil includes a flexible substrate and a conductor pattern on the flexible substrate.

9. The communication terminal device according to claim 1, wherein the punched portion of the rear metal body has a shape that is one of rectangular, substantially rectangular, and equivalent or substantially equivalent to a shape of the cutout portion.

10. The communication terminal device according to claim 1, wherein the rear metal body defining a shield plate and a printed wiring board are provided between a front housing and the planar radiation conductor.

11. The communication terminal device according to claim 10, wherein the power feeding coil and the magnetic body sheet are arranged between the planar radiation conductor and the rear metal body.

12. The communication terminal device according to claim 10, wherein an integrated circuit IC is mounted on the printed wiring board.

13. The communication terminal device according to claim 10, wherein the rear metal body covers the printed wiring board.

14. The communication terminal device according to claim 1, wherein the cutout portion has a shape that is one of circular or substantially circular.

15. The communication terminal device according to claim 1, wherein the rear metal body does not oppose the planar radiation conductor.

16. The communication terminal device according to claim 1, further comprising another planar radiation conductor and a slit defining a T-shaped configuration.

* * * * *